(12) United States Patent
Harrison

(10) Patent No.: US 11,105,625 B1
(45) Date of Patent: Aug. 31, 2021

(54) MULTI-USE LEVEL THAT ILLUMINATES WHEN LEVEL

(71) Applicant: William Clifton Harrison, Billings, MT (US)

(72) Inventor: William Clifton Harrison, Billings, MT (US)

( * ) Notice: Subject to any disclaimer, the term of this patent is extended or adjusted under 35 U.S.C. 154(b) by 328 days.

(21) Appl. No.: 16/501,679

(22) Filed: May 21, 2019

Related U.S. Application Data

(60) Provisional application No. 62/762,997, filed on May 29, 2018.

(51) Int. Cl.
| | | |
|---|---|---|
| *G01C 9/12* | (2006.01) | |
| *G01C 9/18* | (2006.01) | |
| *H01H 9/02* | (2006.01) | |
| *F21V 33/00* | (2006.01) | |
| *H01M 50/10* | (2021.01) | |

(52) U.S. Cl.
CPC ............ *G01C 9/12* (2013.01); *F21V 33/0084* (2013.01); *G01C 9/18* (2013.01); *H01H 9/02* (2013.01); *H01M 50/10* (2021.01)

(58) Field of Classification Search
CPC .......... G01C 9/32; G01C 15/004; G01C 9/06; G01C 9/26; G01C 15/00; G01C 15/008; G01C 15/06; G01C 17/38; G01C 9/20
USPC ....................... 33/371, 379, 366.11
See application file for complete search history.

(56) References Cited

U.S. PATENT DOCUMENTS

| | | | | |
|---|---|---|---|---|
| 4,625,423 A | * | 12/1986 | Sackett | G01C 9/06 33/366.16 |
| 4,876,798 A | * | 10/1989 | Zimmerman | G01C 9/32 33/348.2 |
| 4,932,132 A | * | 6/1990 | Baker | G01C 9/06 33/366.18 |
| 5,020,232 A | * | 6/1991 | Whiteford | G01C 9/32 33/348.2 |
| 5,025,567 A | * | 6/1991 | McWilliams | G01C 9/32 33/348 |
| 5,075,978 A | * | 12/1991 | Crowe | G01C 9/32 33/348.2 |
| 5,180,221 A | * | 1/1993 | Yoder | F21V 33/008 33/348.2 |
| 5,199,177 A | * | 4/1993 | Hutchins | G01C 9/32 33/348.2 |
| 6,058,617 A | * | 5/2000 | Nadu | G01C 9/26 33/366.12 |
| 6,449,859 B1 | * | 9/2002 | Zugel | G01C 9/32 33/348 |
| 6,748,665 B1 | * | 6/2004 | Samp | G01C 9/32 33/348.2 |

(Continued)

*Primary Examiner* — Yaritza Guadalupe-McCall

(57) ABSTRACT

This is a level designed to light-up when level. The drawings and specifications illustrate how each embodiment, nos. 1 thru 10, FIGS. 1 thru 10a, is designed to achieve this by its unique switching system. Each system is designed to complete the electrical circuitry as required for the level's lights to illuminate when the level is level. Each embodiment and switch system, also referred to as switch mechanism or contact switch, utilizes gravity and balance to direct the moving parts and complete the circuitry, whether by use of a pendulum, wheels, ball, balls, roller, rollers, liquid or leveling arm. The circuitry includes lights(s), battery(s), wiring, the switch system, and optionally a manual on/off override switch.

15 Claims, 10 Drawing Sheets

(56) References Cited

U.S. PATENT DOCUMENTS

| | | | | |
|---|---|---|---|---|
| 6,796,045 | B2* | 9/2004 | Hallee | G01C 9/28 |
| | | | | 33/370 |
| 7,024,781 | B1* | 4/2006 | Cowie | G01C 9/32 |
| | | | | 33/348 |
| 7,370,429 | B2* | 5/2008 | Hall | G01C 9/06 |
| | | | | 33/333 |
| 8,359,757 | B1* | 1/2013 | Ruys | G01C 9/32 |
| | | | | 33/348.2 |
| 10,436,584 | B2* | 10/2019 | Gray | G01C 9/26 |
| 2003/0005590 | A1* | 1/2003 | Snyder | G01C 9/28 |
| | | | | 33/370 |
| 2008/0052934 | A1* | 3/2008 | Hall | G01C 9/20 |
| | | | | 33/366.11 |
| 2009/0235544 | A1* | 9/2009 | Spaulding | G01C 9/26 |
| | | | | 33/301 |
| 2010/0223795 | A1* | 9/2010 | Chisholm | G01B 3/566 |
| | | | | 33/290 |
| 2011/0265339 | A1* | 11/2011 | Allemand | G01C 9/32 |
| | | | | 33/366.23 |
| 2016/0138916 | A1* | 5/2016 | Neitzell | G01C 9/36 |
| | | | | 33/381 |

* cited by examiner

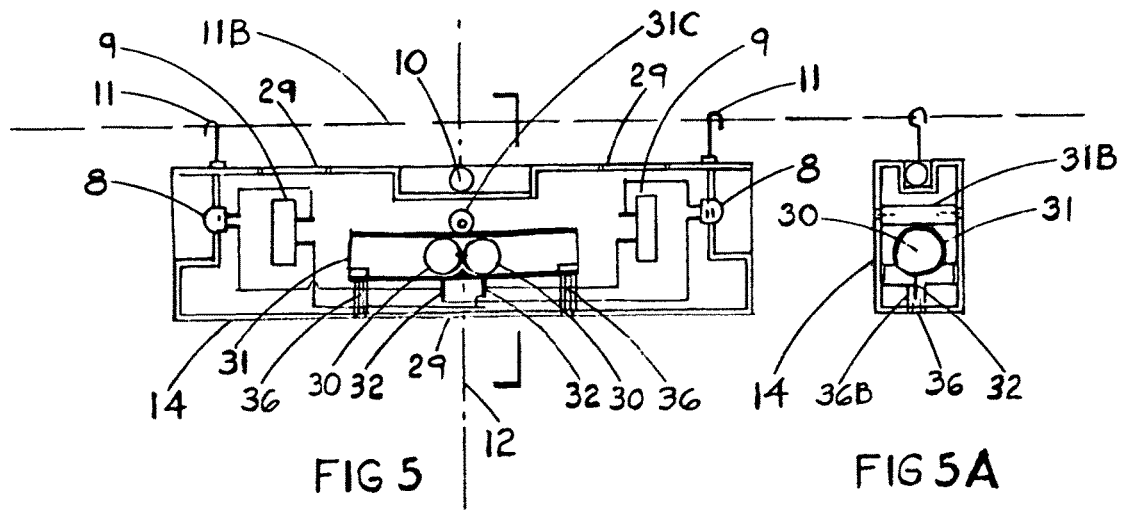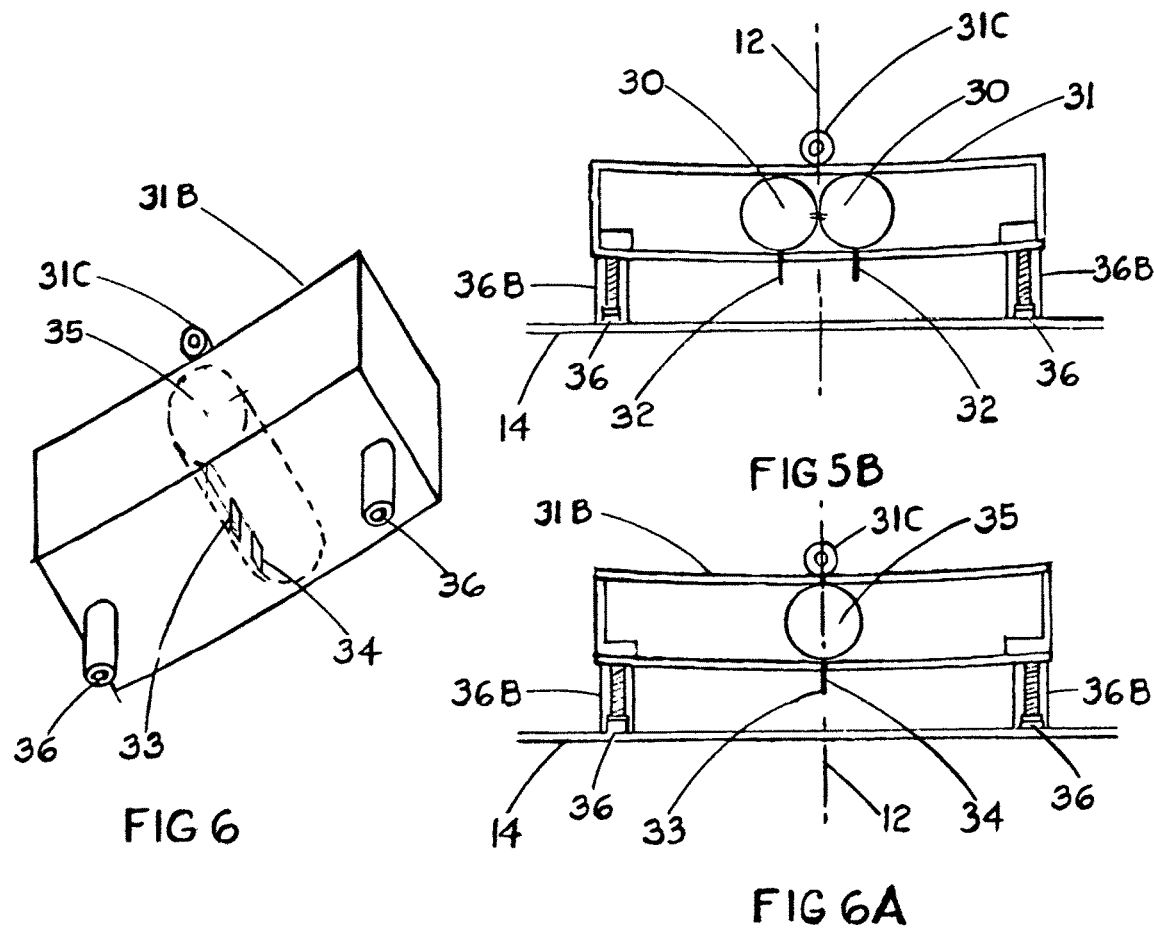

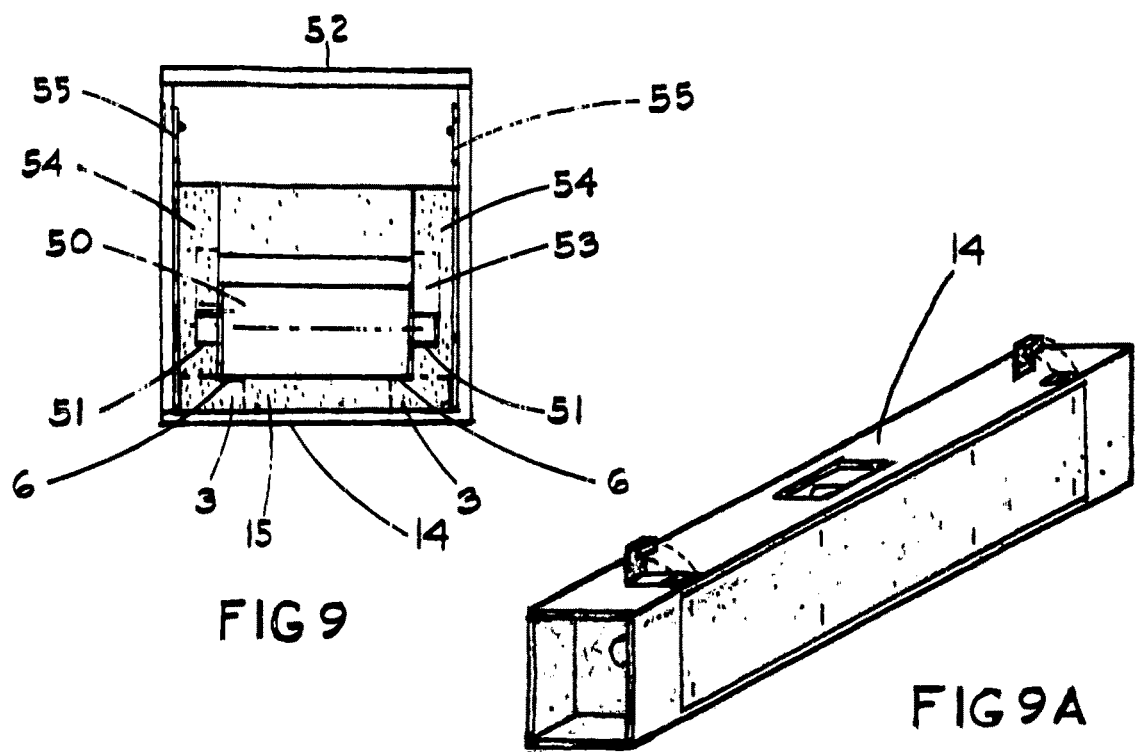
FIG 9
FIG 9A
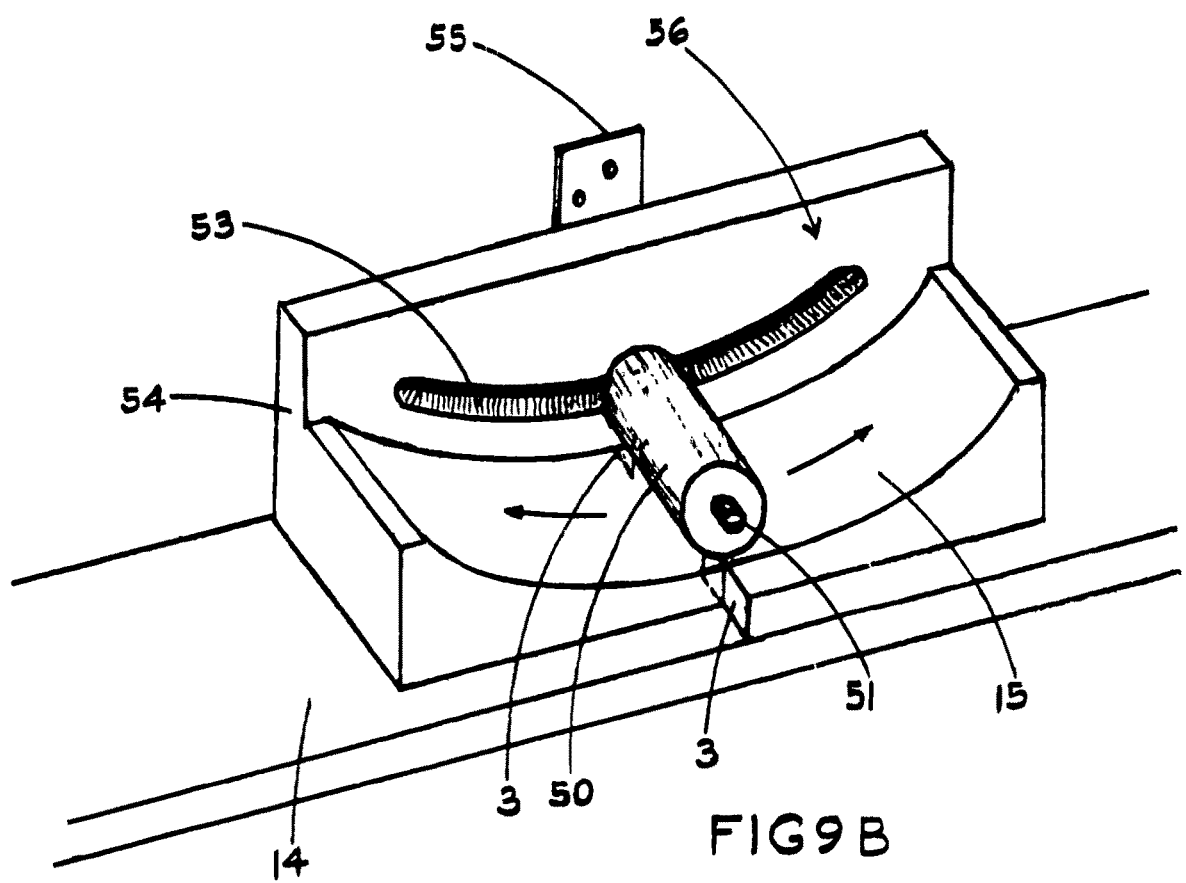
FIG 9B

MULTI-USE LEVEL THAT ILLUMINATES WHEN LEVEL

STATEMENT REGARDING FEDERALLY SPONSORED RESEARCH OR DEVELOPMENT

Not Applicable

THE NAMES OF THE PARTIES TO A JOINT RESEARCH AGREEMENT

None

STATEMENT REGARDING PRIOR DISCLOSURES BY THE INVENTOR OR JOINT MENTOR

None

BACKGROUND OF THE INVENTION

The inventor's experience in working with and teaching inexperienced workers to build quality construction has shown him the value of having quality tools that are simple and easy to use.

Initially, this was the basis for his ideas for improving the performance of a simple string level. With the do-it-yourselfer in mind, he has worked to design a tool that not only simplifies its usage, but also is labor saving, in that, one person can do the work that normally takes two workers using an existing string level. Subsequently, the level has developed into a versatile tool for numerous other uses.

It is a tool especially adaptable, but not limited to, do-it-yourselfers, handymen and small contractors. The levels shown with flat bottom surfaces, optionally with or without magnetic inserts, can also be used as simple hand levels, thus adding to their versatility.

By the lights illuminating when the hand level is level, the user can place it as desired and read it from a distance. This feature is handy and potentially labor saving, in leveling large objects.

SUMMARY

By virtue of its ability to "light up" when level, it becomes a versatile tool that can be used for, but not limited to the following:

1. A labor-saving string level.
2. A level that can be read at a distance, thus it does not require hand holding to be useful and is adaptable to one person leveling large objects, for example: joists, beams, sheet material, etc.
3. Can be used for many purposes as a hand level, when desired.

It is recognized by the inventor that some of the designs and embodiments described herein likely work better than others. It is anticipated that thorough testing would determine which works the best electronically, which is more accurate, and which, or a combination thereof, would be easier to build and use and be less costly.

Definitions

1. Terminals: where electrically conductive contact points may occur.
2. Contact or point or area: where electrically conductive wire, wires, metal rollers, metal wheels, metal balls, or conductive liquid bring metal in contact with metal to continue the circuitry.
3. Switches, of which several types are specified, are created when the contacting parts continue and complete the electrical circuitry necessary to illuminate the lights.
4. Housing: the enclosure of all the interior parts of the level; or as distinguished, the whole or partial enclosure of the switch parts.

BRIEF DESCRIPTION OF THE SEVERAL VIEWS OF THE DRAWINGS

The following drawings, sheets 1 thru 10; illustrate primarily the inner working of embodiments 1 thru 10.

FIGS. 5, 5*a*, and 5*b* illustrate the double ball contact switch and circuitry. Double rollers (not shown) may be used in lieu of double balls.

FIGS. 6 and 6*a* illustrate the single roller contact switch and circuitry.

FIGS. 9, 9*a*, and 9*b* illustrate a single roller contact switch and circuitry.

REFERENCE NUMBERS 1 THROUGH 70 FOR DRAWING FIGS. 1 THRU 10A

Figure 1:
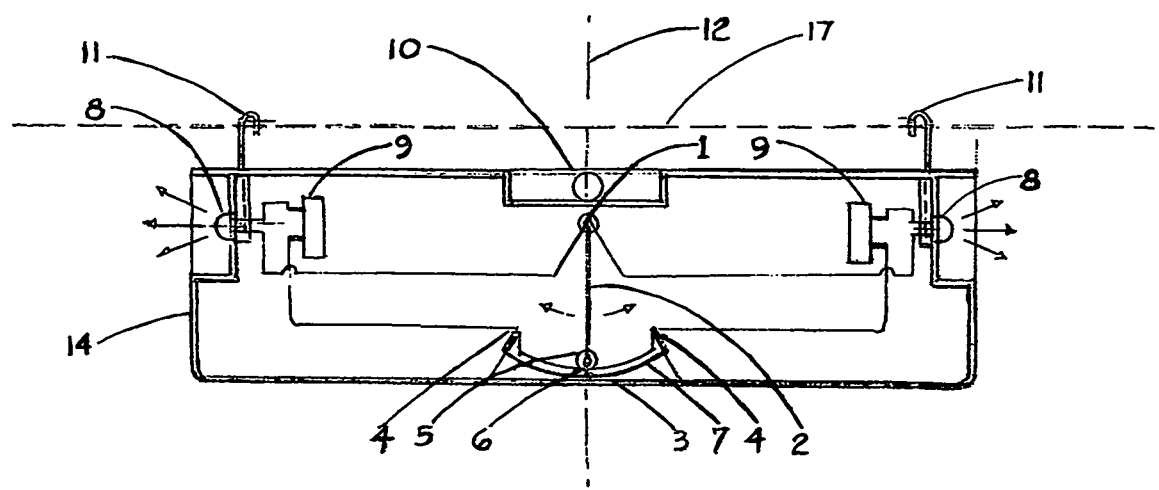
FIGS. 1, 1*a*, 1*b*, 2, 2*a*, and 2*b* illustrate the single arm pendulum contact switch and circuitry.
Figure 1A:
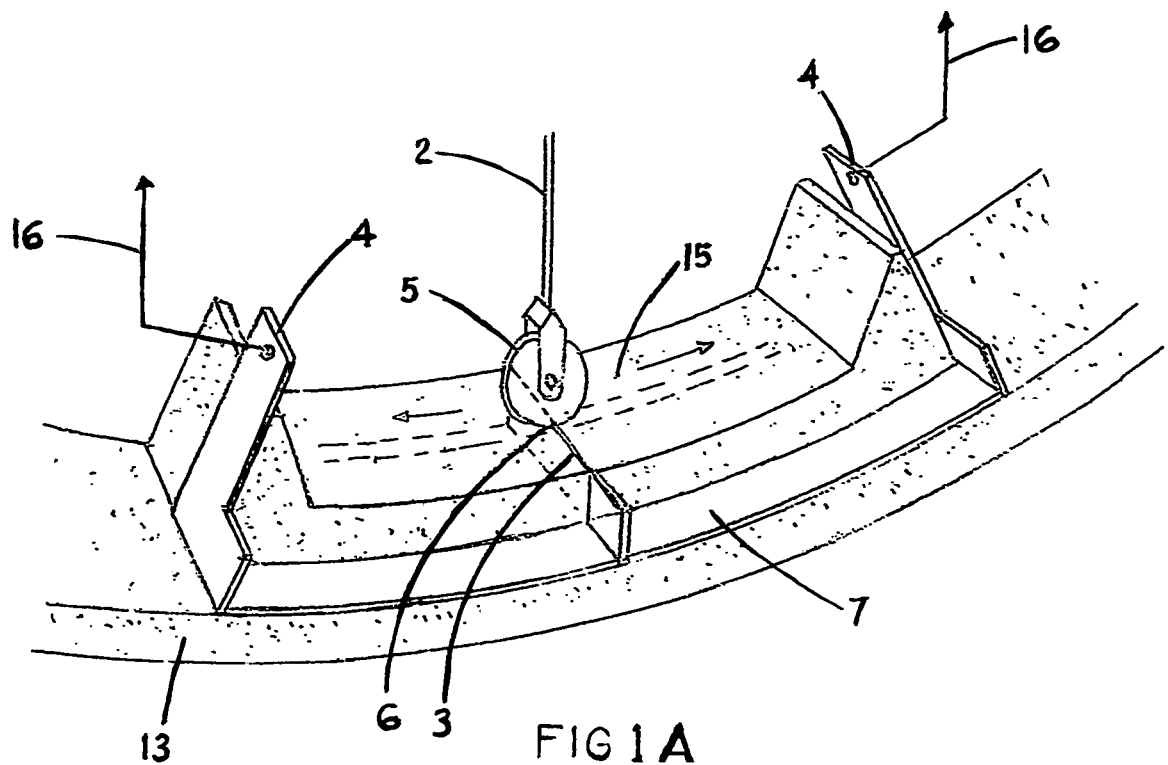
Figure 1B:
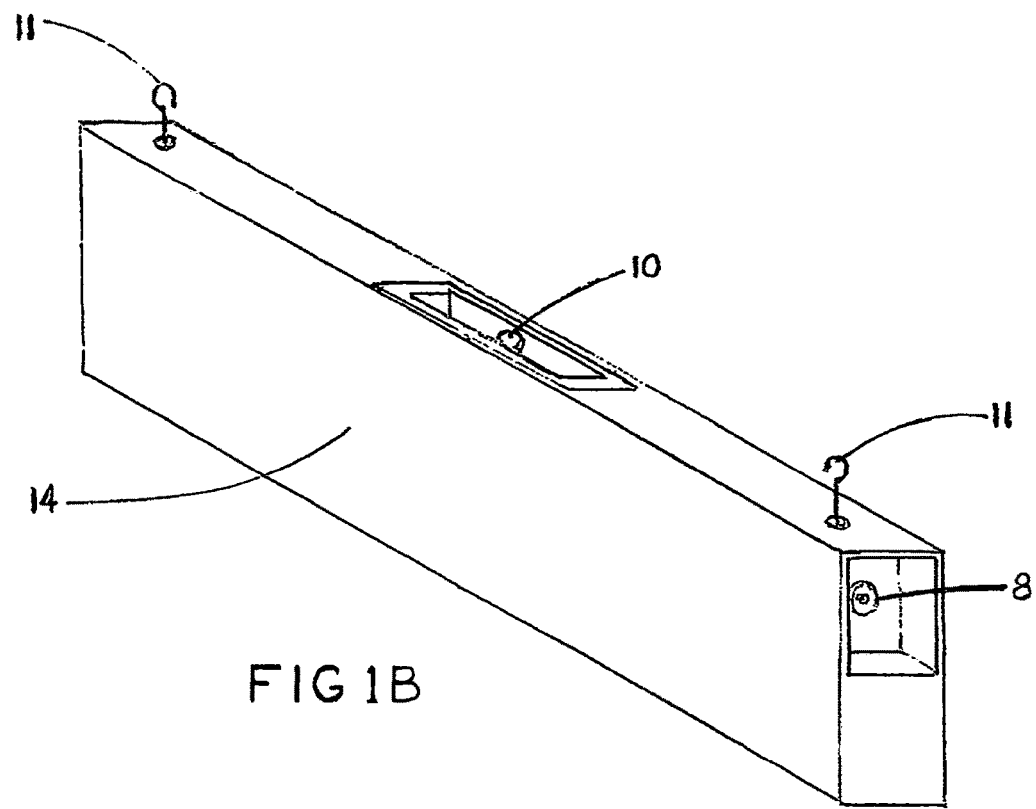

1. Electrically conductive metal pendulum pivot on centerline and x axis 12 of the level.
1*b*. Non-electrically conductive metal pendulum pivot on centerline and x axis 12 of the level.
2. Electrically conductive metal pendulum arm.
2*b*. Non-conductive pendulum arm.
2*c*. Non-conductive pendulum pivot.
3. Metal contact strip, top is flush with non-conducting arced base 15.
3*b*. Metal contact strip equal distance from center line and axis x. Top is flush with non-conducting arced base.
4. Metal standard. Wire to battery connects here. See drawings for which case applies.
4*b*. A single standard. Wires to batteries connect here.
5. Metal wheel or roller may have slip joint at connection to 2.
5*b*. Electrically conductive roller.
6. Contact switch where wheel/roller contacts 3 or 3*b* as indicated.
7. Metal strip that connects to 3 and 4.
7*b*. Metal strip that connects 3 with 4*b*.
8. Led light. May be more than one, such as a cluster of leds.
9. Battery. Sized to illuminate the light or lights.
10. Optional, standard liquid bubble level.

11. Hooks for attaching the leveling string. Hooks may, as an option, fold flat or recede into the main housing 14. Hooks are equidistant from 12.
11b. Leveling string.
12. This is the center line and axis X of the level and contact strip 3.
13. Optional main housing of the level. See 14.
14. Main housing of the level, the bottom surface is smooth and perpendicular to the vertical centerline and axis X. Housing may have removable access panel(s) for service or repair. Bottom surface may have flush magnetic inserts to secure level to metal objects that are being leveled.
15. Curved non-electrically conductive base and guide for wheel 5, or roller 5b.
16. Electric wire to battery(s) 9.
17. Electric wire to light(s) 8.
18. Arm of triangular shaped pendulum. Arm is electrically non-conductive.
19. Electrically conductive arm of triangular shaped pendulum.
20. Electrically conductive fitting made to receive pendulum arm 18, 19 and wheels 21.
21. Electrically conductive wheel 21, may have slip joint connection to fitting 20. When wheel contacts strip 3b, the circuitry is complete.
22. Wheel stop.
23. Non-electrically conductive guide for wheel 21.
24. Electrically conductive standard to receive wires connected to battery(s) 9 or to lights 8 as indicated.
25. Electrically conductive connector of standard 24 to contact strip 3b.
26. Support for wheel guide 23 standard 24, connector 25 and contact strip 3b.
27. Electric wire to battery(s).
28. Electric wire to lights.
29. Access to service or repair.
30. Electrically conductive balls.
31. Housing for balls 30.
31b. housing for roller 35.
31c. Tubular restraint for housing 31 and 31b, restraint secured at ends to housing 14.
32. Electrically conductive terminal imbedded in housing 31, see FIGS. 5, 5a, 5b, and reference numbers 33 and 34 for terminals for roller contact.
33. Electrically conductive terminal imbedded in housing 31b for connecting electric wires to light(s).
34. Electrically conductive terminal imbedded in housing 31b for connecting electric wires to battery(s). Terminals 33 and 34 are aligned on axis 12.
35. Electrically conductive roller in housing 31b.
36. Adjustment screws to minisculely control slope of housings 31 and 31b.
36b. Adjustment "t" form that receives screw 36.
37. Electrically conductive liquid—non-expansive.
37b. Electrically non-conductive bowl for liquid 37.
38. Electrically conductive terminal wired to terminal 39.
39. Electrically conductive terminal to receive wires 27 from batteries 9.
40. Electrically conductive terminal to receive wires 28 from lights 8.
41. Non-electrically conductive roller guide and housing for terminals 42 and 43.
42. Electrically conductive terminal to receive wires from batteries.
43. Electrically conductive terminal to receive wires from lights.
44. Fixed axle for leveling arm 46, to rotate about.
45. Rotating center of leveling arm 46, rotates about fixed axle 44.
46. Leveling connector arm connects to roller 47 or wheels.
47. Rollers or wheels.
48. Smooth guide track for rollers.
49. Slip joint—optional as needed.
50. Electrically conductive roller with guide pin 51. A roller of sufficient diameter to resist lateral rotation could be used wherein the longer roller extends into a wider guide track and serves as its own guide pin.
51. Guide pin.
52. Cover for roller 50 and switch area.
53. Recessed track and guide for roller guide pin.
54. Non-conductive housing for recessed track 53.
55. Electrically conductive standard connected to contact strip 3.
56. Designates a single roller switch assembly using guide tracks to align and direct the roller's movement.
57. Curved non-electrically conductive base and guide for roller 58.
58. Electrically conductive roller. When the roller contacts the conductive and aligned contact points 64 and 66 simultaneously, the lights 8 are illuminated.
59. Housing cover for the roller—transparent between four points 63, opaque otherwise.
60. Switch capsule—likely to be a pre-fab drop-in unit.
61. Transparent cover to observe visible alignment of roller.
61b. Transparent cover to observe visible alignment of ball.
62. Markers—4 per cover 61. Positioned directly above points 63, therefore the capsule 60 is useable as a non-luminous level when the roller's position is such that when viewed from above, the markers 62 and points 63 circumscribe the two tangential edges of the roller.
62b. markers—4 markers per transparent cover 61b and at 90-degree intervals. The markers are positioned directly above the 4 points 63b. The capsule is useable, therefore as a non-luminous level when the ball's position is such when viewed from above, that the markers 62b and points 63b circumscribe the ball.
63. Points on roller cover housing 59—four points total.
63b. Points on ball cover housing 68—four points total.
64. Conductive contact point that is connected to switch 65 thence 67 to battery(s) 9.
65. On/off switch to disrupt circuitry when level is not in use (switch may be optional).
66. Conductive contact point that is connected to leds, lights. When ball 70 contacts points
64 and 65 simultaneously, the circuit is complete. The level is level a and the lights are illuminated.
67. Connects on/off switch 65 to battery(s) or directly from contact point 64 to battery(s) if on/off switch is not included.
68. Ball cover housing.
69. Circular arc and track in base of ball 70 housing—to properly guide and align ball 70.
70. Electrically conductive ball. When ball contacts the conductive and aligned points 64 and 66 simultaneously, the lights 8 are illuminated.

DETAILED DESCRIPTION OF DRAWINGS AND SPECIFICATIONS

How the Level is Used and Made:

How the level is used as a string level: when the string that the level is attached to is level at the mid-point between the two points to be leveled, then a light or lights come(s) on and is visible from either of the two points. This enables one person to fix the string at one point at the level desired, measure and set the level at mid-point, go to the other point, raise or lower the string until the light(s) is on, and mark the level point.

An optional feature on this level may be the old fashion bubble level as a back-up to the battery powered led lights.

The level's outer housing, whether made from plastics, light weight metal, or other material will be as light weight as feasible and still maintain the elements and parts required. It is anticipated that the housing may have a removable cover(s) and/or access to the batteries, circuitry and other parts.

- Housed parts of the level such as batteries, battery holders, pendulum, contact rollers, roller contact plate and standard for attaching electric wires will be carefully placed and apportioned so that all parts are balanced with respect to the level's vertical "x" center line. Balance with respect to the longitudinal centerline may be achieved by attached weights or other means if necessary; possibly by offsetting the string's hooks.
- The flat-bottomed level can also be used as a hand level, whose usage as such is enhanced by its lights turning on when level. This means that the user can utilize it even when some distance away.
- Flush magnetic inserts may be set in the bottom of the level for contact and secureness when leveling magnetizable objects. It is anticipated that optional on/off manually operated switches may be applied to the circuitry of various switch systems.

How the Level Works:

The drawings shown herein show basically several types of electrical switch mechanisms, FIGS. 1 thru 10a. Each switch is designed to complete the electrical circuitry when the switch contact points meet, which occurs when the level is level. When the circuitry is complete, the light(s) come "on."

Embodiment #1 utilizes a single arm pendulum switch. See drawings FIGS. 1 thru

Figures 2, 2A:
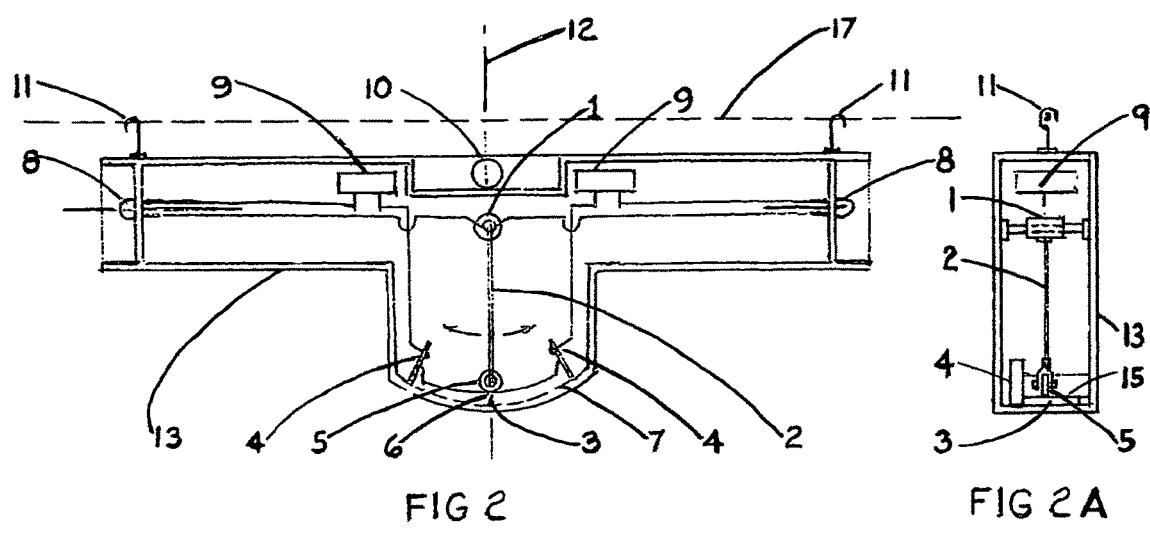
Figure 2B:
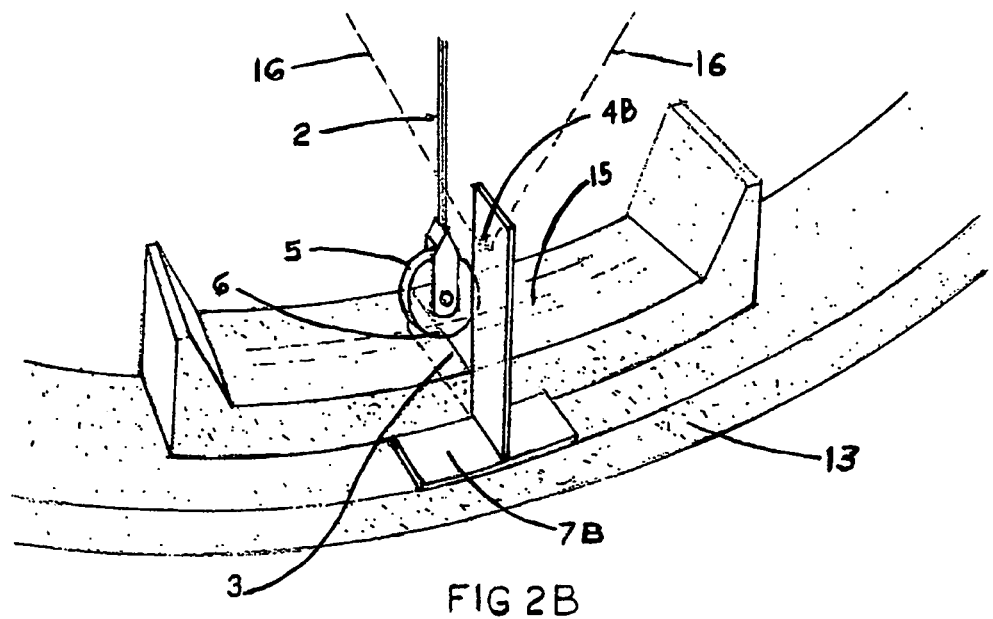

- 2b. Wherein a metal pendulum arm 2 aided by gravity, contacts a contact metal strip 3. At point 6, completes the circuitry to the battery(s) via a connecting metal strip 7 or 7b that runs to and includes terminal points 4 or 4b. Using the metal wheel 5, pendulum arm 2, and spindle 1 at the pendulum pivot as conductors, the circuitry flows to the leds 8 and the battery(s) 9 by wire, thus completing the circuitry and illuminating the lights.
- A slip joint may be installed, if needed, in the pendulum arm or the contact wheel's attachment to the pendulum arm to improve the contact between the wheel 5 and the contact strip 3.
- Wire terminal points 3 and 4b may be one piece. See FIG. 2b.

Figure 3A:
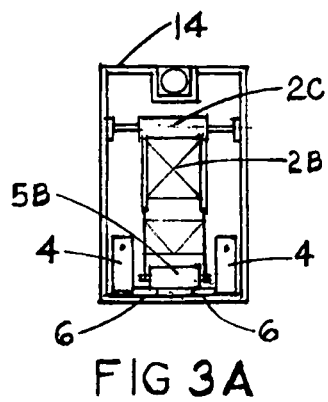
FIGS. 3, and 3*a* illustrate the single arm pendulum and roller contact switch and circuitry.
Figure 3:
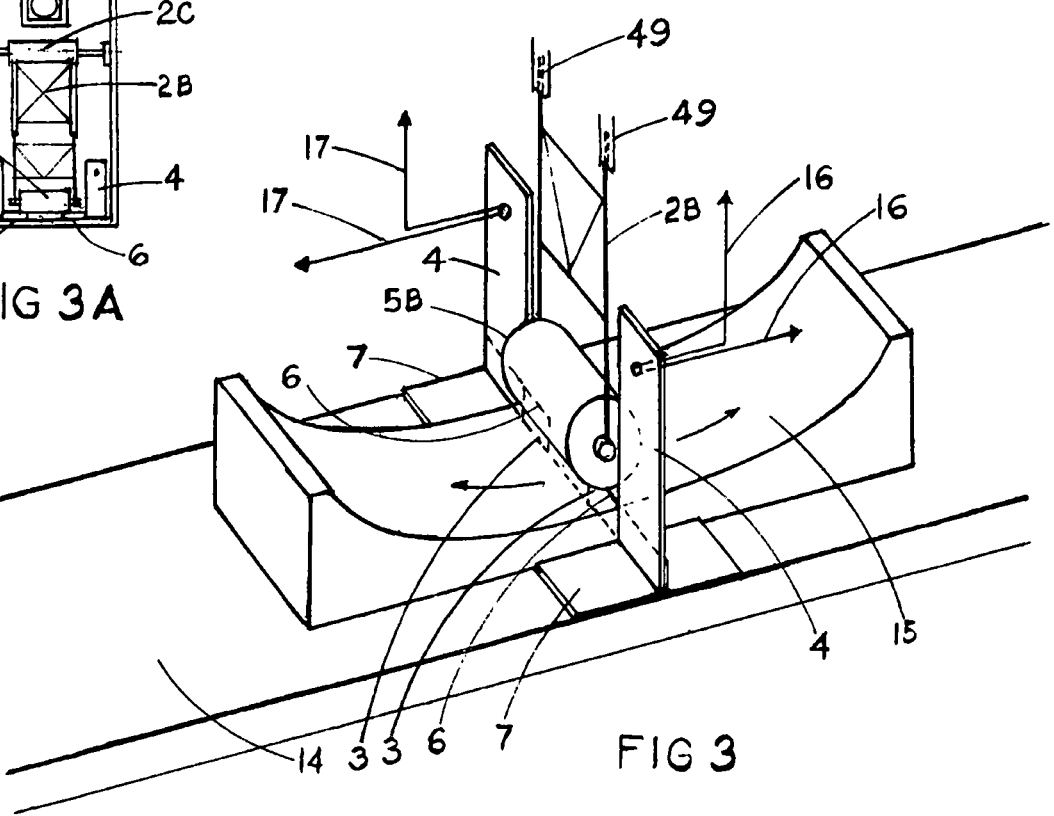

Embodiment #2 FIGS. 3 and 3a also use a single arm pendulum switch.

- The pendulum arm is sufficiently wide enough to guide an electrically conductive roller which is free to roll back and forth on the curved non-electrically conductive base 15. When the roller contacts the metal contact strips 3 simultaneously, the circuit is complete and the lights 8 are illuminated.

Figure 4:
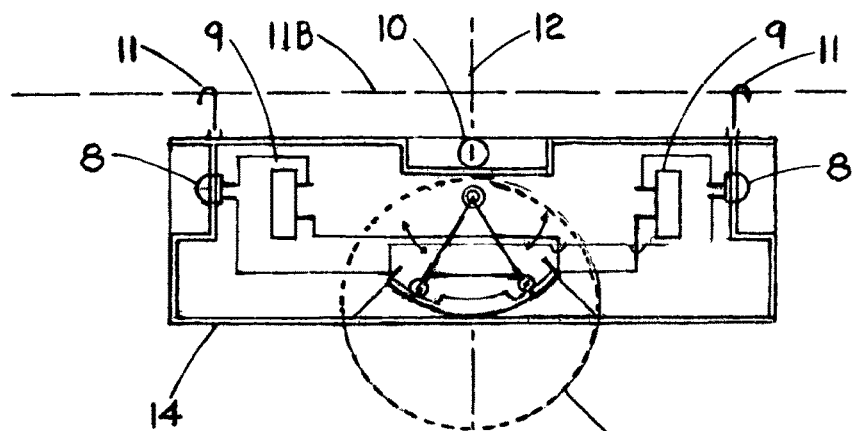
FIGS. 4, 4*a*, and 4*b* illustrate the triangular pendulum contact switch and circuitry.
Figure 4A:
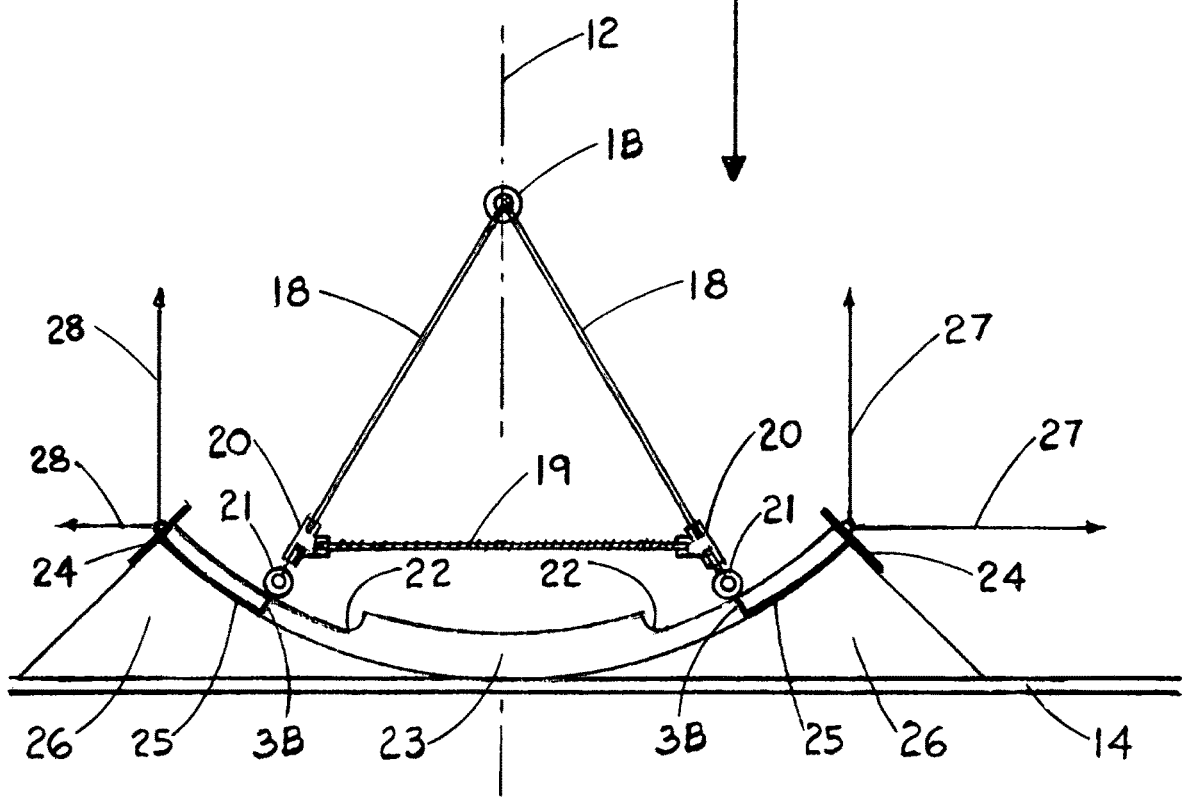
Figure 4B:
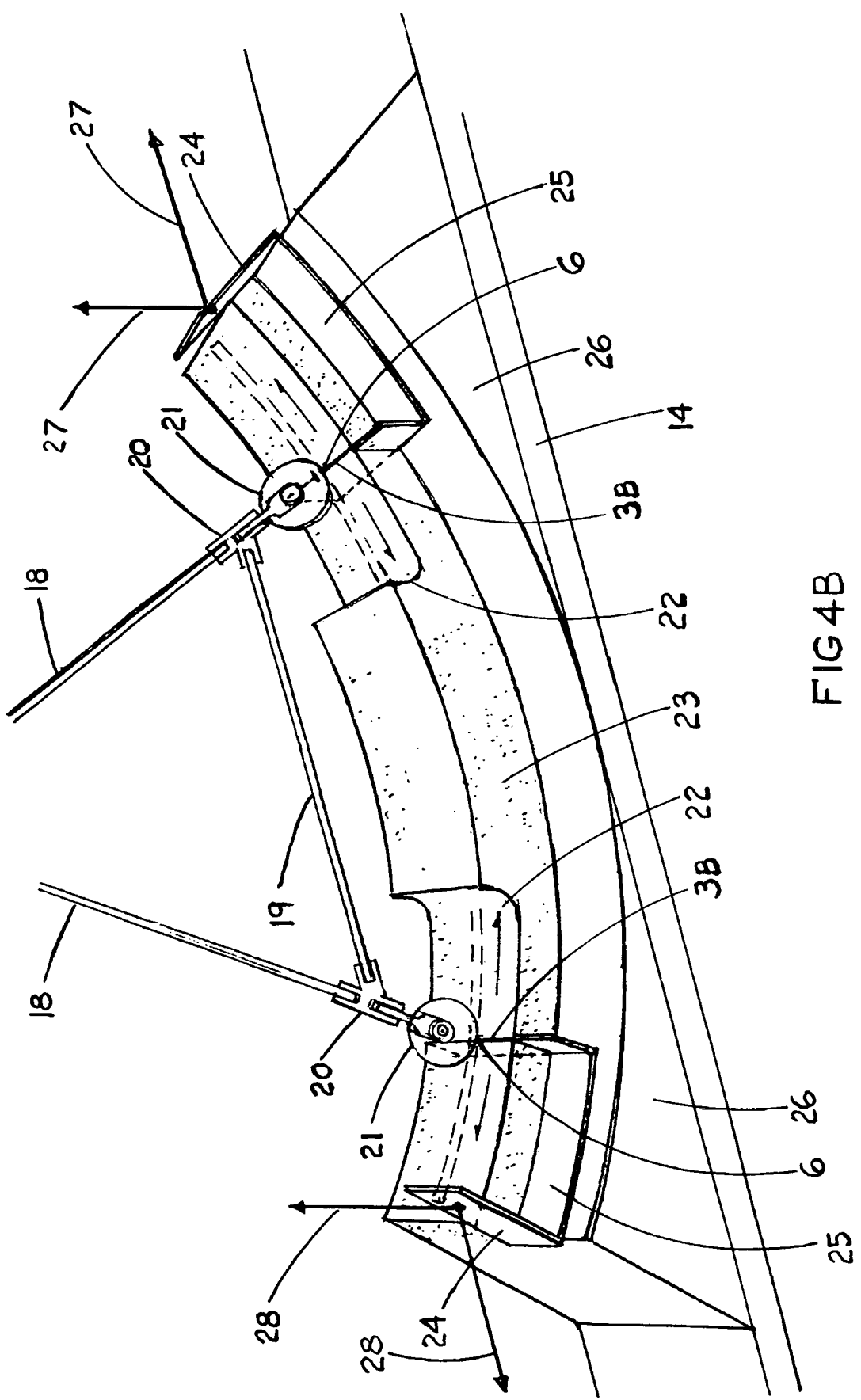
Figure 7:
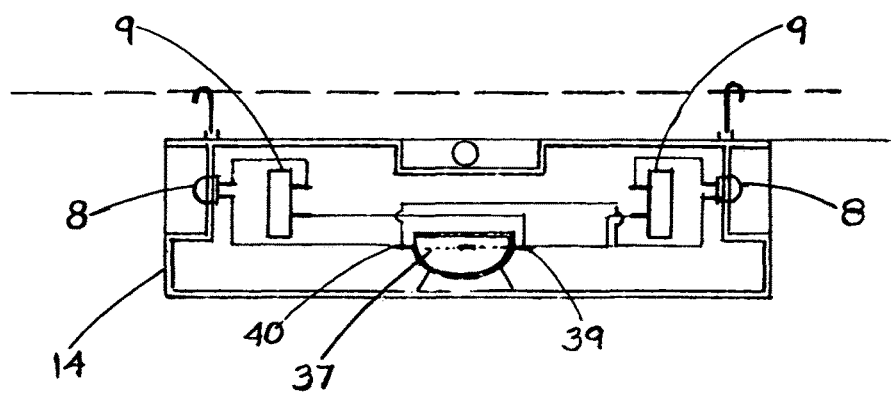
FIGS. 7 and 7*a* illustrate the liquid contact switch and circuitry.
Figure 7A:
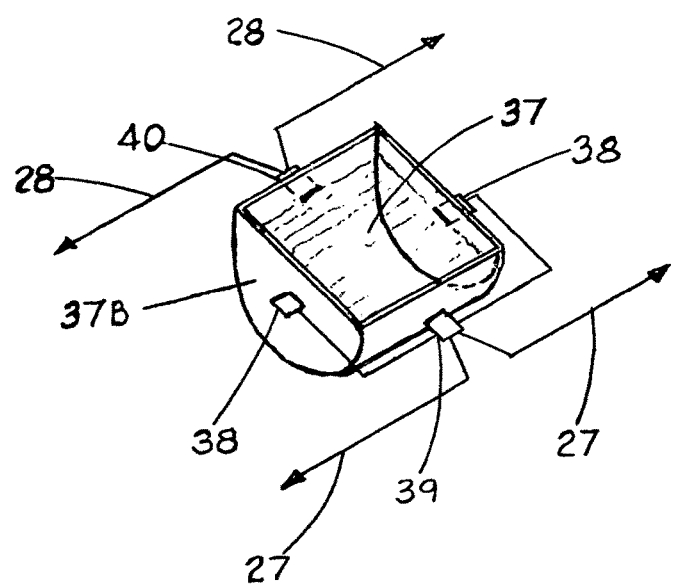

Embodiment #3 utilizes a triangular shaped pendulum. See drawings FIGS. 4, 4a and 4b.

- This system utilizes the metal bottom leg 19 of the pendulum to contact two metal strips 3b simultaneously when the level is level. When this happens, the circuitry is complete and the lights go "on." This system has the potential to be very accurate and somewhat difficult to manufacture.

Embodiment #4, see drawings FIGS. 5, 5a, and 5b using metal balls or rollers (not shown)

- to complete the circuitry when the level is level. The balls 30 are housed in a non-conductive tube 31 or similar shape that slopes to the level's center line 12 and "x" axis, the minimum slope needed for both balls to move toward each other and contact when the level is level and to separate when it is not. At the said point of contact, each ball or roller makes contact, with a metal terminal 32 imbedded in the non-conductive housing. Wires attached to the terminals connect the batteries and the lights, thus completing the circuitry and illuminating the lights. The selected batteries may vary in size and shape to meet the weight and power and space used criteria desired. An option not shown works basically the same except that the light is at the top of the level and visible to the user when the level is used as a string level or as a hand level.

Embodiment #5, see drawings FIGS. 6 and 6a, uses a single metal roller, to

- Complete the circuitry when the level is level. To achieve this, the roller moves such that its main axis lies perpendicular to the long axis of the roller's housing when the roller's tangential line of contact lies over and makes contact with the two metal terminals, 33 and 34, which are connected, one to the batteries and one to the lights, the circuitry is completed, and the lights are illuminated. To guide the roller, so that its tangential line of contact with the terminals is as described above. The roller may contain two guide grooves that sit over two corresponding raised guide strips in the housing, thus preventing rotation and misalignment of the roller.

Embodiment #6 uses an electrically conductive liquid 37 contact to complete the circuitry between metal contacts 39 and 40 when the level is level, thus illuminating the lights. The liquid and its non-conductive bowl 37b and cover are centered, with respect to the level's long axis and "x" axis. The bowl is connected to the level's housing by a non-conductive support and attachment. The electric wires 27 from the batteries 9 connect to the bowl contact 39 and thence to terminal 38. Electric wires 28 connect to bowl contact 40 to the lights.

Figures 8, 8A:
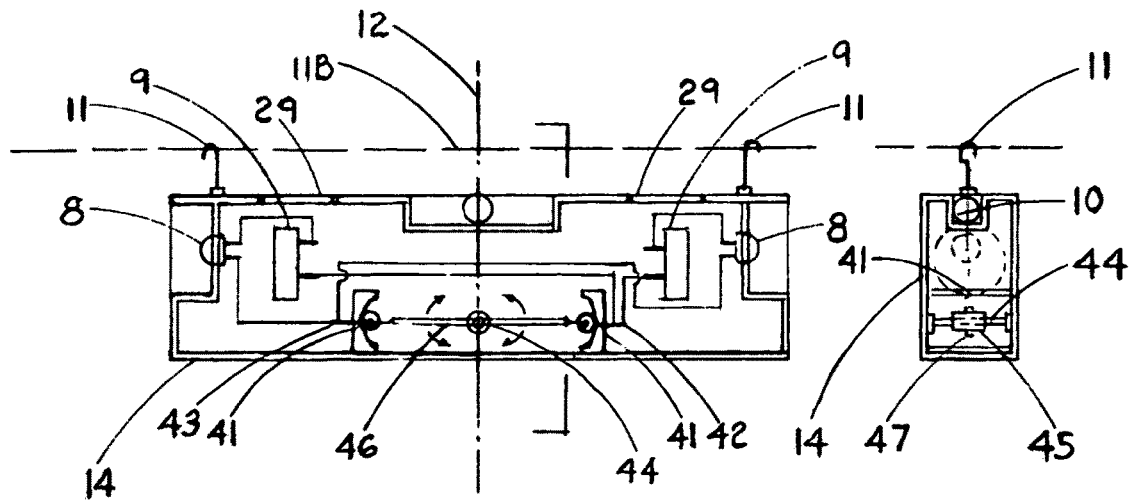
FIGS. 8, 8*a*, and 8*b* illustrate the electrically conductive leveling arm contact switch and circuitry.
Figure 8B:
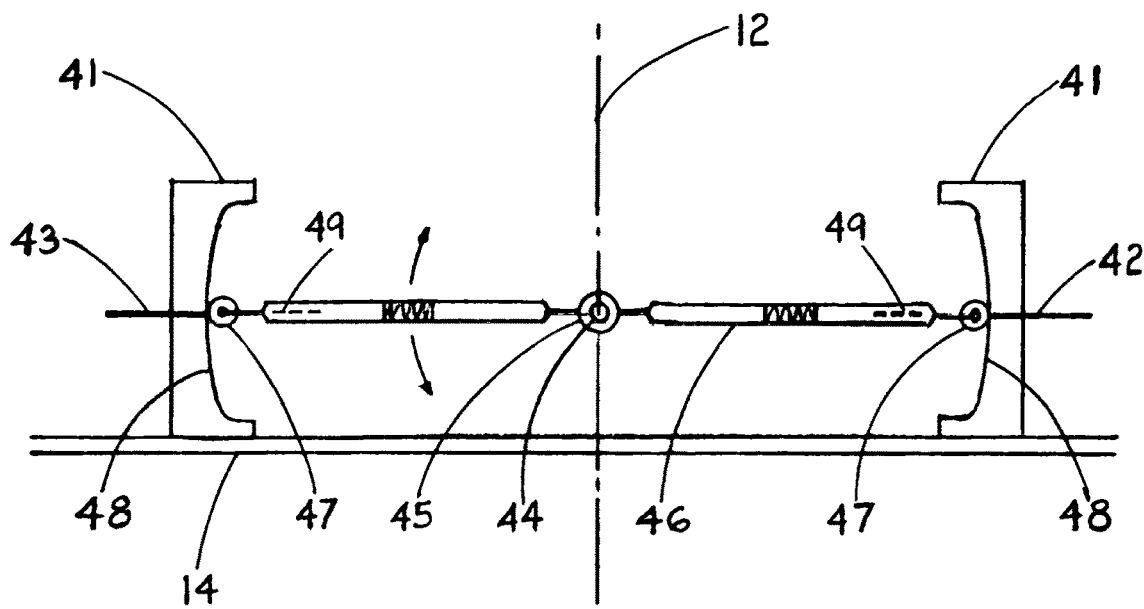

Embodiment #7 see FIGS. 8, 8a and 8b, uses a metal leveling connector arm 46 with

- A connecting metal roller 47 at each end. When the level is level, the rollers contact the ends of the terminals 42 and 43 and the circuitry is complete, and the lights come on. The metal leveling connector arm may be very lightly spring loaded to, if necessary, improve contact with the terminals. The roller guide and housing 41, the roller 47, the terminals 42 and 43, and the connector 46 arm may also be placed vertical at the center of the level.

Embodiment #8 see FIGS. 9, 9a and 9b, uses a metal roller 50, guided by track 53, to complete the circuitry when the level is level, thus illuminating the lights. To achieve this, the roller moves such that its main axis lies perpendicular to the long axis of the level and its housing 14. To turn the switch and the lights "on", the roller moves, by aid of gravity, until it overlays and makes contact simultaneously with the metal contact strips 3.

Figure 9D:
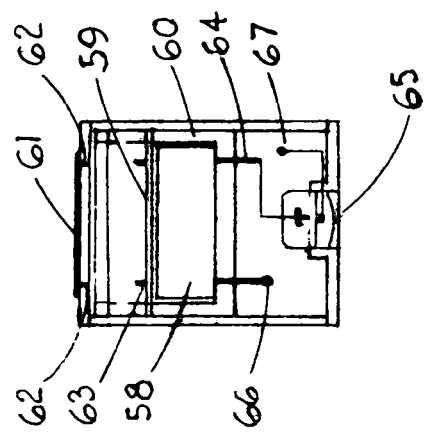
FIGS. 9*c* and 9*d* illustrate a single roller contact switch and circuitry with a Manual on/off override switch.
Figure 9C:
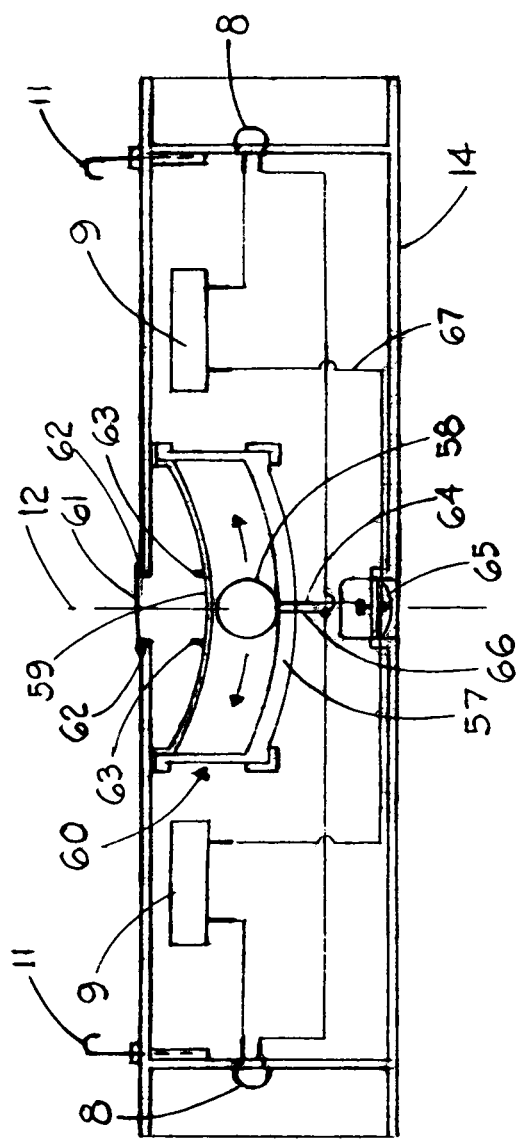

Embodiment #9 FIGS. 9c and 9d illustrate a design similar to FIGS. 9, 9a and 9b.

The optional manually operated on/off switch to de-activate the circuitry when the level is not in use, is shown. Also, the guide markers 62 and 63 are shown to illustrate how the level's roller and its alignment can be visibly seen and used as a secondary guide in positioning the object to be leveled.

Figure 10A:
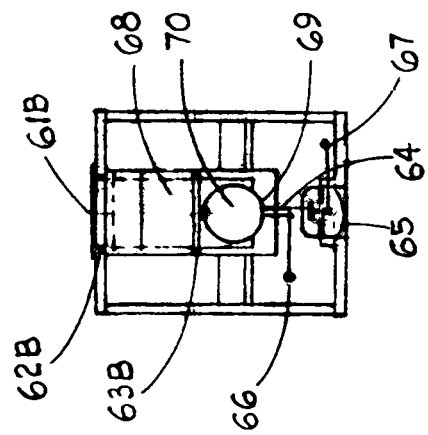
FIGS. 10 and 10*a* illustrate a single ball contact switch and circuitry with a manual on/off override switch.
Figure 10:
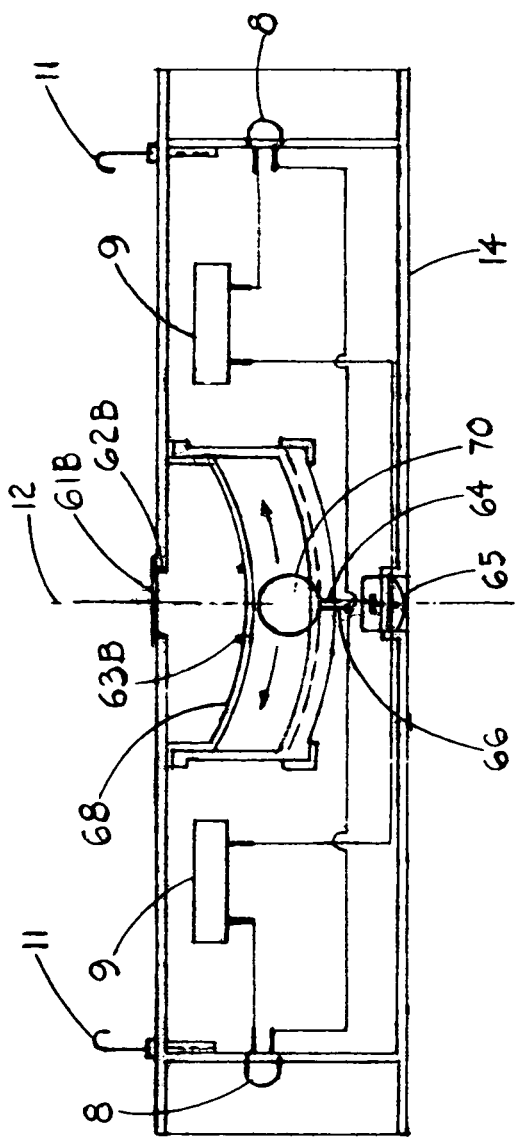

Embodiment #10, FIGS. 10 and 10a illustrate how a single electrically conductive ball can activate and complete the circuitry.

The ball 70 moves freely back and forth in an oval guide track 69, aided by gravity. When the level is level the ball (now at the low point of its travel) makes contact with the contact points 64 and 66 as in FIG. 10 or as in FIG. 10a. In FIG. 10 the closely spaced points are parallel to the arced ball track and guide. In FIG. 10a the closely spaced contact points are perpendicular to the arced ball track and guide. In either case the contact points are at the low area of the track and guide 69. The manual switch 65 is likely but optional.

The markers 62b and points 63b are shown to illustrate how the level's ball and its alignment can be visibly seen and used as a guide in positioning the object to be leveled.

Manufacturing:

Critical features of the level are weight, balance, distribution of weight and the switch system, which activates the electrical circuitry and the lights' illumination. It is important that the shape of the level and the materials used therein be optimized. This includes, but is not limited to, the choice of batteries and their location, electrical wiring layout and sizes, light or lights location, battery and parts access for replacement and service.

The manufacturing process and the materials used for the encasement of the level and its inner parts is likely to be, but not limited to, casting or molding lightweight metal or plasticized material.

Features:

Flexibility:
1. Small scale and light weight versions can be used as string levels.
2. Levels designed with flat bases perpendicular to the vertical or "x" axis may be used as near or remotely read levels for numerous applications.
3. Re-usable
4. Versatility Simplicity:
1. Ease of handling and usage
2. Ease of storage
3. Low tech

CONCLUSIONS, RAMIFICATIONS AND SCOPE

The level and its ramifications and embodiments described herein, by virtue of its illuminating when level, provide the user with a tool that can be used by an individual to perform tasks that would likely require an additional person. For example: usage as a string level and in levelling large objects. The ability to "read" the level at a distance allows the user to use his/her hands or other means for the placement and positioning of the object that is to be levelled.

The level is not limited herein in size. It could readily be of many sizes and lengths. The levelling and switch mechanisms shown herein could be applied.

It is envisioned that the switch mechanisms, also referred to as contact switches, and switch system(s), could be manufactured as a capsule or unit separately and inserted in and anchored to the levels main housing.

While the above descriptions contain many specificities, they should not be construed as limitations on the scope, but rather as exemplification of the embodiments thereof. Other variations are possible.

In conclusion, the descriptions herein are not meant to limit the inventor as to materials used, the methods used, the methods of manufacture or components and their assembly or the application thereof.

The invention claimed is:

1. A level comprising: an outer housing having a reference surface, a compartment provided in the housing to replace or service parts of the level, at least one battery disposed within the compartment of said housing, a light source, an electrically energizable circuitry including contact terminals and contact points disposed in said housing, a switch mechanism, said switch mechanism comprising a gravity energized mechanism connected to said contact points, such that upon determination of levelness the circuitry is activated and must be maintained in contact in order to activate the light source, whereby illuminating of the level is achieved as long as levelness is achieved and maintained.

2. The level of claim 1 wherein the at least one battery energizes the circuitry.

3. The level of claim 1 wherein the light source illuminates when the level is level and the circuit is completed.

4. The level of claim 1 wherein the circuitry comprises wires, at least one terminal and at least one contact point all forming an electrical system that connects said at least one battery to the light source.

5. The level of claim 1 wherein the housing also comprises hooks for suspending the level and utilizing it as a string level; wherein said hooks may be fixed, adjustable, retractable, folding.

6. A level comprising a an outer housing having a reference surface, a compartment provided in the housing to replace or service parts of the level, at least one battery disposed within the compartment of said housing, a light source, an electrically energizable circuitry including contact terminals and contact points disposed in said housing, a switch mechanism, said switch mechanism comprising a gravity energized mechanism connected to said contact points, such that upon determination of levelness the circuitry is activated and must be maintained in contact in order to activate the light source, whereby illuminating of the level is achieved as long as levelness is achieved and maintained, which allows for readability at a distance, it is labor saving when used as a string level or leveling large objects, and allows for hands free use.

7. The level of claim 6, wherein said switch mechanism comprises a single arm electrically conductive pendulum switch, which when energized by gravity during determination of levelness, completes and activates the circuitry.

8. The level of claim 7, wherein said pendulum switch comprises a triangular shaped pendulum switch mechanism using the bottom chord of the pendulum to come into contact with said contact points when levelness is achieved and completes the circuitry.

9. The level of claim 6, wherein said switch mechanism comprises two electrically conductive balls or rollers which come together when level to complete the circuitry.

10. The level of claim 6, wherein the switch mechanism comprises a single electrically conductive roller which completes the circuitry when level and connects the terminals to the at least one battery and light source.

11. The level of claim 6, wherein the switch mechanism further comprises electrically conductive liquid, and wherein when levelness is achieved, the circuitry is completed by said liquid connecting the metal contacts to the at least one battery and light source.

12. The level of claim 6, wherein the switch mechanism is an electrically conductive leveling connector arm with rollers at each end that connect to terminals to the at least one battery and light source, said leveling connector arm rotates about a fixed axle in a see saw type motion.

13. The level of claim 6, wherein the switch mechanism comprises an electrically conductive roller with a guide track that completes the circuitry by connecting the metal contacts leading to the at least one battery and light source.

14. The level of claim 6, wherein the switch mechanism comprises a manual on/off switch and guide markers for assisting in positioning the object to be leveled.

15. The level of claim 6, wherein the switch mechanism comprises an electronically conductive ball that makes simultaneous contact with the closely spaced contact points that connect to the at least one battery and light source.

\* \* \* \* \*